United States Patent
Hayashi

(10) Patent No.: US 7,801,711 B2
(45) Date of Patent: Sep. 21, 2010

(54) GENERATED STEAM ESTIMATION METHOD AND DEVICE FOR HEAT RECOVERY STEAM GENERATOR, AND MAINTENANCE PLANNING SUPPORT METHOD AND SYSTEM FOR POWER GENERATION FACILITY

(75) Inventor: Yoshiharu Hayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1194 days.

(21) Appl. No.: 11/331,219

(22) Filed: Jan. 13, 2006

(65) Prior Publication Data

US 2006/0200325 A1 Sep. 7, 2006

(30) Foreign Application Priority Data

Jan. 17, 2005 (JP) ............................. 2005-008654

(51) Int. Cl.
  *G06G 7/66* (2006.01)
(52) U.S. Cl. ................. 703/6; 703/2; 703/18; 702/183; 702/184; 700/288
(58) Field of Classification Search ..................... 703/2, 703/6, 18; 702/183, 184; 700/288
See application file for complete search history.

(56) References Cited

U.S. PATENT DOCUMENTS

| | | | | |
|---|---|---|---|---|
| 4,328,556 A | * | 5/1982 | Abe et al. ..................... 700/23 |
| 4,455,614 A | * | 6/1984 | Martz et al. .................. 700/288 |
| 4,802,100 A | * | 1/1989 | Aasen et al. ................. 700/288 |
| 6,691,065 B2 | * | 2/2004 | Hayashi et al. .............. 702/184 |
| 6,853,930 B2 | * | 2/2005 | Hayashi et al. ............... 702/61 |
| 6,907,381 B2 | * | 6/2005 | Hayashi et al. .............. 702/181 |
| 7,065,472 B2 | * | 6/2006 | Hayashi et al. .............. 702/184 |
| 7,096,156 B2 | | 8/2006 | Hosaka et al. |
| 7,152,005 B2 | * | 12/2006 | Hayashi et al. ............... 702/60 |
| 7,162,354 B2 | * | 1/2007 | Takada et al. ................ 701/100 |
| 7,260,502 B2 | * | 8/2007 | Hayashi ...................... 702/183 |
| 2003/0004659 A1 | * | 1/2003 | Hayashi et al. ............... 702/60 |

FOREIGN PATENT DOCUMENTS

| | | |
|---|---|---|
| JP | 64-8006 | 1/1989 |
| JP | 5-280703 | 10/1993 |
| JP | 08-296453 | 11/1996 |
| JP | 10-292902 | 11/1998 |
| JP | 2004-162948 | 6/2004 |
| JP | 2004-211587 | 7/2004 |

* cited by examiner

*Primary Examiner*—Jason Proctor
(74) *Attorney, Agent, or Firm*—Mattingly & Malur, P.C.

(57) ABSTRACT

A method for configuring the physical model of a heat recovery steam generator that can estimate the state quantity of generated steam from the state quantity of the exhaust gas to be introduced, and capable of establishing the physical model of a combined cycle power generation facility thereby. The optimum values for the flow rates Flp and Fhp, pressures and temperatures Tlp and Thp of the low pressure main steam and high pressure main steam are computed in such a way as to ensure that an objective function E stored in advance will come close to zero.

12 Claims, 5 Drawing Sheets

FIG. 8
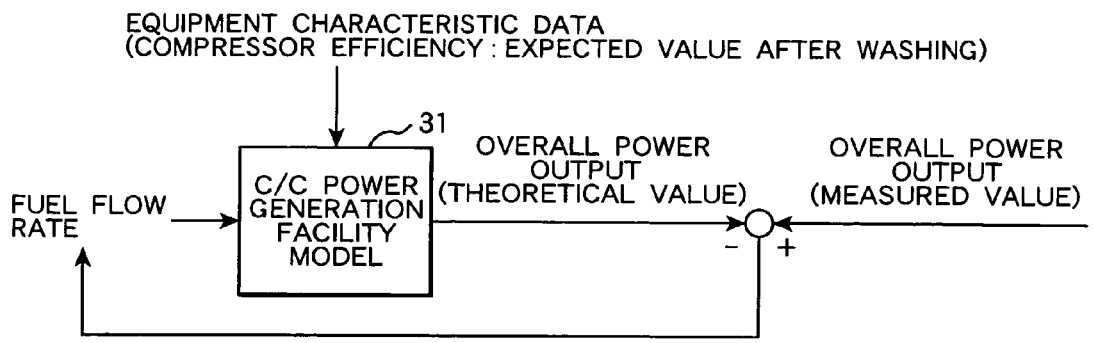
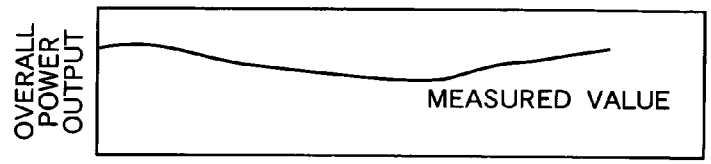
FIG. 9 (a)
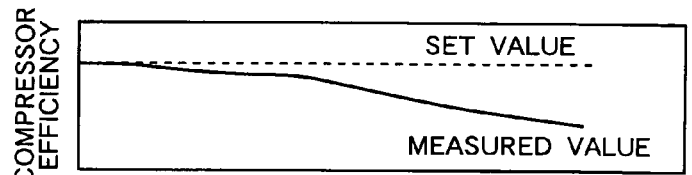
FIG. 9 (b)
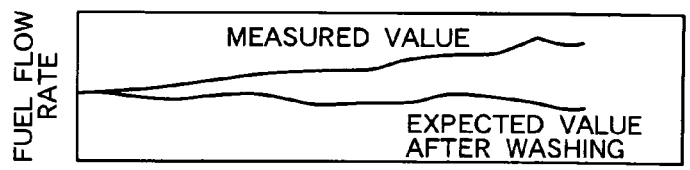
FIG. 9 (c)
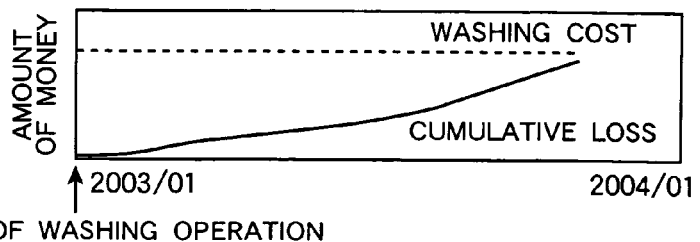
FIG. 9 (d)

GENERATED STEAM ESTIMATION METHOD AND DEVICE FOR HEAT RECOVERY STEAM GENERATOR, AND MAINTENANCE PLANNING SUPPORT METHOD AND SYSTEM FOR POWER GENERATION FACILITY

CLAIM OF PRIORITY

The present application claims priority from Japanese application serial No.2005-08654, filed on Jan. 17, 2005, the contents of which is hereby incorporated by references into this application.

BACKGROUND OF THE INVENTION

1. Field of Technology

The present invention relates to a heat recovery steam generator, particularly to a combined cycle power generation facility.

2. Background of Art

The combined cycle power generation facility uses both a gas turbine and steam turbine to generate electric power. In the gas turbine, a compressor compresses intake air to produce compressed air, a combustor burns fuels with the compressed air to produce combustion gas and a turbine is driven by the combustion gas, whereby electric power is generated. A heat recovery steam generator generates high-temperature and high-pressure steam by using exhaust gas (exhaust heat) exhausted from the gas turbine, and a steam turbine is driven by said generated steam.

when the intake air is taken into the gas turbine, a filter provided with the gas turbine removes dust and dirt contained in atmosphere. However, the dust and dirt which cannot be removed by the filter come inside and stick onto the compressor vane. This will gradually reduce efficiency of the compressor and efficiency of electric power generation, and require frequent washing operation. Methods have been proposed in the prior art to determine the time of performing the washing operation. In one of such methods, for example, the corrected compressor efficiency is computed by subtracting the influence of the inlet air temperature of the compressor and inlet guide vane angle by correction. Then comparison is made between the corrected compressor efficiency and the initial value of the compressor efficiency subsequent to previous washing operation, whereby timing for washing operation is determined (e.g. Patent Document 1).

[Patent Document 1] Japanese Application Patent Laid-Open Publication No. Hei 08-296453

SUMMARY OF THE INVENTION

Problems to be Solved by the Invention

However, the aforementioned prior art has required the following improvements:

According to the aforementioned prior art, the timing for washing operation is determined based on the amount of reduced compressor efficiency. To be more specific, the timing for washing operation has been determined in such a way that washing operation is required when the contamination of the compressor has reached a certain level. This method has failed to determine the optimum timing for washing operation from the viewpoint of the total cost (i.e. cost performance) wherein consideration is given to the labor cost for washing operation, loss of power generation due to shutdown of the power generation facility during washing operation, and operation cost at the time of recovery of compressor efficiency as a result of washing operation (e.g. fuel cost). In a combined cycle power generation facility composed of a gas turbine, heat recovery steam generator and steam turbine, the influence of the steam turbine is not taken into account, for example, if the timing for washing operation is determined based on the parameter related only to the performance of the gas turbine such as the compressor efficiency. Thus, this method has failed to determine the optimum timing for washing operation.

Further, in a combined cycle power generation facility composed of a gas turbine, if the gas turbine performance has reduced, conversion from the generated heat value to the electric power is reduced and the temperature of the exhaust gas from the gas turbine is increased, although the gas turbine output is reduced. This increases the amount of steam generated by the heat recovery steam generator, with the result that the steam turbine output is increased. To put it another way, the behavior of the gas turbine output and steam turbine output runs counter to a change in the gas turbine performance. Many of the combined cycle power generation facilities are designed in a single shaft type structure, wherein the gas turbine, steam turbine and generator are connected on one shaft. What can be measured in such as a case is the overall power output of the power generation facility. The power outputs of the gas turbine and steam turbine could not be measured. For such reasons, it has been difficult to estimate the influence of the power generation facility upon the overall power output as a total of the power outputs of the gas turbine and steam turbine, and hence to estimate the amount of reduced operation costs when the gas turbine performance has been recovered.

To determine the optimum timing for maintenance work at a reduced total cost, it is necessary to configure a physical model of the entire power generation facility, including the characteristics of at least one of the gas turbine, heat recovery steam generator and steam turbine, and to provide the physical models of the gas turbine, heat recovery steam generator and steam turbine. To be more specific, it has been necessary to configure the physical model of the heat recovery steam generator to ensure that the output value of the gas turbine (state quantity of exhaust gas) is inputted into the physical model of the heat recovery steam generator, and the output value of the heat recovery steam generator (state quantity of generated steam) is inputted into the physical model of the gas turbine.

The object of the present invention is to provide a generated steam estimation method and system for heat recovery steam generator capable of configuring the physical model of a heat recovery steam generator that can estimate the state quantity of generated steam from the state quantity of the exhaust gas to be introduced, and capable of establishing the physical model of a combined cycle power generation facility thereby.

Means for Solving the Problems (1) To achieve the aforementioned object, the present invention provides a generated steam estimation method for heat recovery steam generator capable of estimating the state quality of the generated steam from the state quantity of the exhaust gas to be introduced from a gas turbine, wherein the optimum values for the flow rate, pressure and temperature of the generated steam are computed by computing means to ensure that the objective function stored in storage means in advance will come close to a predetermined target value, wherein the parameters used represent:

a deviation between the theoretical value for the temperature of exhaust gas at the inlet of the steam generator and a predetermined set value or measured value; and a deviation between the amount of heat transfer computed from the difference in temperatures of exhaust gas at the inlet and outlet in an evaporator or the difference in temperatures of water/steam at the inlet and outlet, and the amount of heat transfer computed from the difference in temperatures of exhaust gas and water.

In the present invention, when computing the heat balance of the exhaust gas and steam (or water) in the heat recovery steam generator using the computing means, the predetermined set values (or measured values) are inputted as the flow rate of the exhaust gas and temperature of water at the inlet of the steam generator, for example. Desired initial values are inputted as the temperature of the heat recovery steam generator at the steam generator outlet and flow rate of the generated steam. The pressures of the exhaust gas and steam (or water) are inputted using the flow rate-pressure transform function stored in the storage means in advance. The heat balance formula is used for calculation for each of the heat exchangers (e.g. economizer, evaporator and super-heater) located in the area from the outlet to inlet of the steam generator. (To put it in greater details, the temperature of the exhaust gas on the outlet side of the heat exchanger and the temperature of the steam (or water) on the inlet side of the heat exchanger are inputted to compute the temperature of the exhaust gas on the inlet side of the heat exchanger and the temperature of the steam (or water) on the outlet side of the heat exchanger. The resultant computed values are inputted as the temperature of the exhaust gas on the outlet side of the heat exchanger and the temperature of the steam (or water) on the inlet side of the heat exchanger in the adjacent heat exchanger. This computation is repeated). In this manner, the temperature of the exhaust gas at the steam generator inlet and the temperature of the generated steam are computed. The aforementioned computation is repeated so that the objective function stored in storage means in advance will come close to a predetermined target value, wherein the parameters used represent a deviation between the theoretical value for the temperature of exhaust gas at the inlet of the steam generator and a predetermined set value (or measured value); and a deviation between the amount of heat transfer computed from the difference in temperatures of exhaust gas at the inlet and outlet in an evaporator or the difference in temperatures of water/steam at the inlet and outlet, and the amount of heat transfer computed from the difference in temperatures of exhaust gas and water. This procedure allows the optimum values for the flow rate, pressure and temperature of the generated steam to be obtained in the final phase.

As described above, the present invention enables the state quantity of the generated steam to be estimated from the state quantity of the exhaust gas to be introduced. It establishes the physical model of a combined cycle power generation facility based on the combination between the physical models of the gas turbine and steam turbine via the physical model of the heat recovery steam generator.

(2) The generated steam estimation method described in (1), wherein it is preferred that predetermined set values or measured values should be inputted as the flow rate of the exhaust gas and the water temperature at the inlet of the steam generator; desired initial values should be inputted as the temperature of exhaust gas at the outlet of the steam generator and the flow rate of the generated steam; the pressures of exhaust gas and steam or water should be computed and inputted using the flow rate/pressure transform function stored in the storage means in advance; and the optimum values for flow rate, pressure and temperature of the generated steam should be computed by the computing means to ensure that the objective function will come close to the target value.

(3) The generated steam estimation method described in (1), wherein it is preferred that the optimum value for the spray flow rate of a high pressure spray should be computed by the computing means to ensure that the theoretical value for the temperature of the generated steam will come close to a predetermined set value controlled by the high pressure spray.

(4) To achieve the aforementioned object, the present invention provides a generated steam estimation device for heat recovery steam generator capable of estimating the state quality of the generated steam from the state quantity of the exhaust gas to be introduced from a gas turbine, the generated steam estimation device containing:

storage means for storing an objective function in advance, the objective function being based on parameters representing:

a deviation between the theoretical value for the temperature of exhaust gas at the inlet of the steam generator and a predetermined set value or measured value; and a deviation between the amount of heat transfer computed from the difference in temperatures of exhaust gas at the inlet and outlet in an evaporator or the difference in temperatures of water/steam at the inlet and outlet, and the amount of heat transfer computed from the difference in temperatures of exhaust gas and water; and computing means for computing the optimum values for the flow rate, pressure and temperature of the generated steam to ensure that the objective function stored in the storage means in advance will come close to a predetermined target value.

(5) The generated steam estimation device described in (4), wherein it is preferred that the computing means should take the steps of inputting predetermined set values or measured values as the flow rate of the exhaust gas and the water temperature at the inlet of the steam generator; inputting desired initial values as the temperature of exhaust gas at the outlet of the steam generator and the flow rate of the generated steam; computing and inputting the pressures of exhaust gas and steam or water using the flow rate/pressure transform function stored in the storage means in advance; and computing the optimum values for flow rate, pressure and temperature of the generated steam to ensure that the objective function will come close to the target value.

(6) The generated steam estimation device described in (4), wherein it is preferred that the computing means should compute the optimum value for the spray flow rate of a high pressure spray to ensure that the theoretical value for the temperature of the generated steam will come close to a predetermined set value controlled by the high pressure spray.

(7) To achieve the aforementioned object, the present invention provides a maintenance planning support method for power generation facility, wherein the combined cycle power generation facility including a gas turbine, a heat recovery steam generator and steam turbine further contains:

a physical model of the combined cycle power generation facility based on the combination between physical models of the gas turbine and steam turbine is stored in a physical model section, via a physical model of the heat recovery steam generator wherein the optimum values for the flow rate, pressure and temperature of the generated steam are computed to ensure that the objective function stored in storage means in advance will come close to a predetermined target value, wherein the parameters used represent:

a deviation between the theoretical value for the temperature of exhaust gas at the inlet of the steam generator and a predetermined set value or measured value; and a deviation between the amount of heat transfer computed from the difference in temperatures of exhaust gas at the inlet and outlet in an evaporator or the difference in temperatures of water/steam at the inlet and outlet, and the amount of heat transfer computed from the difference in temperatures of exhaust gas and water;

wherein a cumulative loss computing means is used to compute the amount of the operation cost reduced by the recovery of the equipment characteristics resulting from the execution of maintenance work of the power generation facility, using the physical model of the combined cycle power generation facility, and to computer the cumulative loss of the operation cost resulting from the absence of the maintenance work; and wherein the means for determining the timing for maintenance work is used to make comparison between the cumulative loss and maintenance cost, thereby determining the timing for implementing the maintenance work.

Use of the physical model of the combined cycle power generation facility described in (1) makes it possible to get the influence on the overall power output of the power generation facility (i.e. influence on the gas turbine and steam turbine outputs) at the time of recovery of the equipment characteristics. This provides calculation of the cumulative loss resulting from the absence of the maintenance work of the power generation facility. Comparison between the cumulative loss and maintenance cost makes it possible to determine the timing for maintenance work at a reduced total cost.

(8) The maintenance planning support method for power generation facility described in (7), wherein it is preferred that display means should indicate the amount of the operation cost reduced by the recovery of the equipment characteristics resulting from the execution of maintenance work or the cumulative loss of the operation cost resulting from the absence of the maintenance work.

(9) The maintenance planning support method for power generation facility described in (7), wherein it is preferred that the information based on the timing for executing the maintenance work should be supplied to users via communication means.

(10) The present invention provides a maintenance planning support system for power generation facility, wherein the combined cycle power generation facility including a gas turbine, a heat recovery steam generator and steam turbine further contains:

a process data section for acquiring and storing the process data for the combined cycle power generation facility:

an equipment characteristic data section for computing and storing the equipment characteristic data for the gas turbine, heat recovery steam generator and steam turbine from the process data;

a physical model section for storing a physical model of the combined cycle power generation facility based on the combination between physical models of the gas turbine and steam turbine, via a physical model of the heat recovery steam generator wherein the optimum values for the flow rate, pressure and temperature of the generated steam are computed to ensure that the objective function stored in storage means in advance will come close to a predetermined target value, wherein the parameters used represent:

a deviation between the theoretical value for the temperature of exhaust gas at the inlet of the steam generator and a predetermined set value or measured value; and a deviation between the amount of heat transfer computed from the difference in temperatures of exhaust gas at the inlet and outlet in an evaporator or the difference in temperatures of water/steam at the inlet and outlet, and the amount of heat transfer computed from the difference in temperatures of exhaust gas and water;

a cumulative loss computing means for computing the amount of the operation cost reduced by the recovery of the equipment characteristics resulting from the execution of maintenance work of the power generation facility, using the physical model of the combined cycle power generation facility, and for computing the cumulative loss of the operation cost resulting from the absence of the maintenance work; and means for determining the timing for maintenance work for making comparison between the cumulative loss and maintenance cost, thereby determining the timing for implementing the maintenance work.

(11) The maintenance planning support system for power generation facility described in (10), wherein the maintenance planning support system is preferred to further contain display means for indicating the amount of the operation cost reduced by the recovery of the equipment characteristics resulting from the execution of maintenance work or the cumulative loss of the operation cost resulting from the absence of the maintenance work.

(12) The maintenance planning support system for power generation facility described in (10), wherein the maintenance planning support system is preferred to further contain communication means for supplying users with the information based on the timing for executing the maintenance work determined by the means for determining the timing for maintenance work.

EFFECTS OF THE INVENTION

The present invention establishes the physical model of a combined cycle power generation facility.

BRIEF DESCRIPTION OF THE DRAWINGS

FIG. 8 is a diagram representing a method of calculation using the physical model of the combined cycle power generation facility in an embodiment of the maintenance planning support method for the power generation facility of the present invention.

FIG. 9(a) is a diagram showing chronological changes in the measured value of the overall power output of the combined cycle power generation facility in an embodiment of the maintenance planning support method for the power generation facility of the present invention;

FIG. 9(b) is a diagram showing chronological changes in the measured value of the compressor efficiency of a gas turbine, together with a design value;

FIG. 9(c) is a diagram showing chronological changes in the measured value of the fuel flow rate of a gas turbine, together with the expected value subsequent to washing operation; and FIG. 9(d) is a diagram showing chronological changes in the cumulative loss of operation costs together with washing operation costs.

DETAILED DESCRIPTION OF THE INVENTION

Best Mode for Carrying Out the Invention

The following describes an embodiment of the present invention with reference to drawings.

Figure 1:
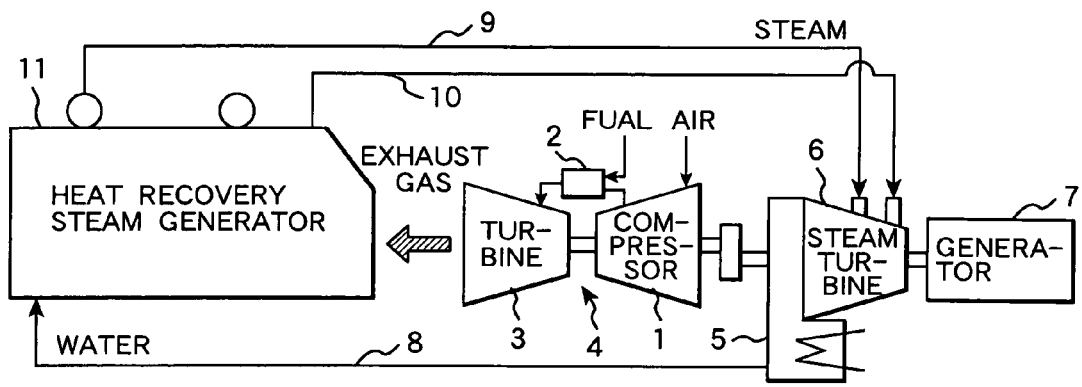
FIG. 1 is a schematic diagram representing the equipment configuration of the combined cycle power generation facility as an object of the present invention.
Figure 2:
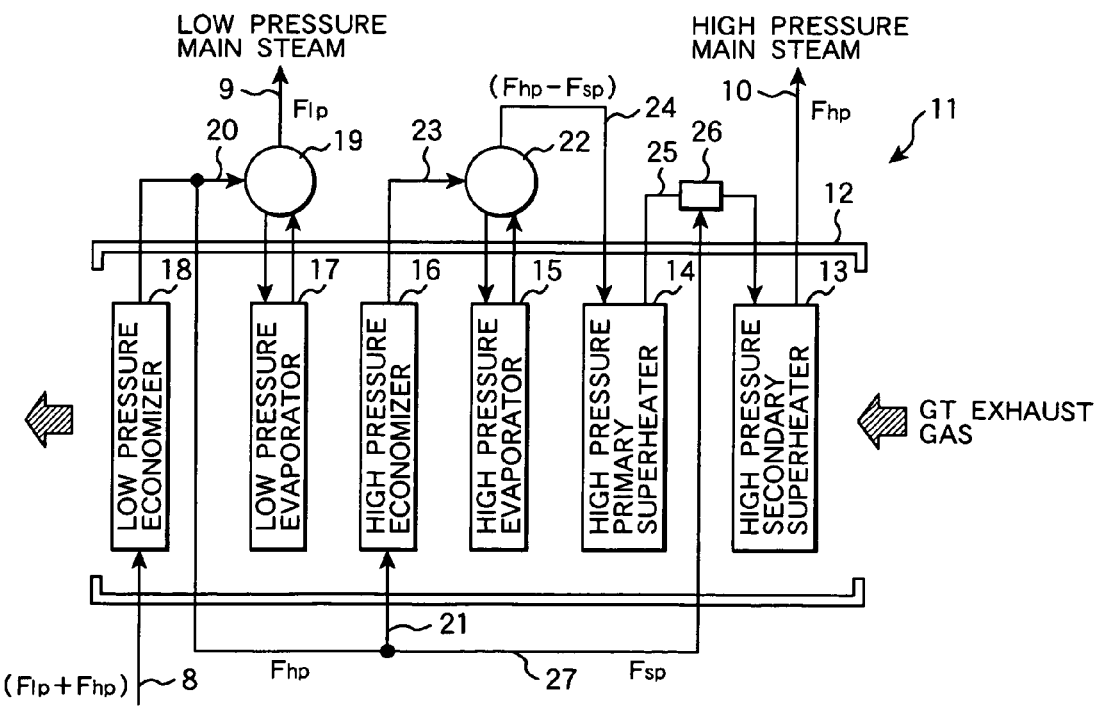
FIG. 2 is a schematic diagram representing an example of the arrangement of a heat recovery steam generator as an object of the present invention.

FIG. 1 is a schematic diagram representing the equipment arrangement of the combined cycle power generation facility as an object of the present invention. FIG. 2 is a schematic diagram representing an example of the arrangement of a heat recovery steam generator as an object of the present invention.

In FIGS. 1 and 2, the combined cycle power generation facility contains:

a compressor 1 for compressing the air (atmosphere);

a combustor 2 for burning by mixing the air compressed by the compressor 1 with the fuel, a gas turbine 4 equipped with a turbine (expansion equipment) 3 driven by expansion of the combustion gas (compressed and heated air) from the combustor;

a steam turbine 6 connected to the rotor shaft of this gas turbine 4 and provided with a condenser 5;

a generator 7 driven by the driving force produced by the gas turbine 4 and steam turbine 6; and a heat recovery steam generator 11 for generating the steam (low-pressure main steam and high-pressure main steam having different pressures and temperatures in the present embodiment) by heat exchange between the exhaust gas (combustion gas having expanded) from the gas turbine 4 and water condensed in the condenser 5, and for supplying the steam turbine 6 with the low- and high-pressure main steam via the pipes 9 and 10. The steam used by the steam turbine 6 is cooled by the condenser 5 and is condensed to water, which is collected into the heat recovery steam generator 11. The condensed water is circulated through the steam turbine 6, condenser 5 and heat recovery steam generator 11.

The heat recovery steam generator 11 is provided with a duct passageway 12 where the exhaust gas coming from the gas turbine 4 flows approximately in the horizontal direction (from the center right to the left in FIG. 2). A plurality of heat exchangers (details not illustrated; for example, a structure made up of a plurality of pipes where steam or water flow) such as a high pressure secondary superheater 13, high pressure primary superheater 14, high pressure evaporator 15, high pressure economizer 16, low pressure evaporator 17 and low pressure economizer 18 are provided in that order in the duct passageway 12 from the exhaust gas inlet side of the steam generator (center right in FIG. 2) to the outlet side of the steam generator (center left in FIG. 2). The temperature of the exhaust gas inside the duct passageway 12 is reduced in the direction from the inlet side of the steam generator to the outlet side, by heat exchange between exhaust gas and steam (or water) by these heat exchanger, whereas there is an increase in the temperature of the steam (or water) in each heat exchanger.

The water condensed in the condenser 5 is fed through the pipe 8 into the low pressure economizer 18 where it is heated. Part of water is fed into the low pressure steam drum 19 provided on the top side (top side in FIG. 2) of the duct passageway 12, via the pipe 20. The bottom (bottom side in FIG. 2) of the low pressure steam drum 19 is connected with the low pressure evaporator 17. The steam (low pressure main steam) vaporized by heating and boiling of the water fed into the low pressure evaporator 17 goes upward to enter the low pressure steam drum 19 and is fed to the steam turbine 6 through the low pressure steam drum 19.

The pipe 20 is provided with a pipe 21 branched and connected therewith. Part of water fed from the low pressure economizer 18 is fed into the high pressure economizer 16 through the pipe 21. It is heated there and is fed to the high pressure steam drum 22 provided on the top side of the heat recovery steam generator 11, through the pipe 23. The bottom side of the high pressure steam drum 22 is connected with the high pressure evaporator 15. The steam vaporized by heating and boiling of the water fed into the high pressure evaporator 15 (high pressure main steam) goes upward and enters the high pressure steam drum 22. The steam in the high pressure steam drum 22 is fed into the high pressure primary superheater 14 through the pipe 24. It is heated there and is fed to the high pressure secondary superheater 13 through a pipe 25 and a high pressure spray 26.

The high pressure spray 26 sprays part of water (i.e. water cooler than the steam heated by the high pressure primary superheater 14) from the low pressure economizer 18 through the pipe 27 branched and connected with the pipe 21, thereby reducing the temperature of the steam from the high pressure primary superheater 14. The steam fed into the high pressure secondary superheater 13 is heated and is fed to the steam turbine 6 through the pipe 10. Reduction of steam temperature by the high pressure spray 26 is intended to control the temperature of the high pressure main steam (steam generator outlet temperature) to a predetermined set valued and to avoid abrupt deterioration of the steam turbine 6. Accordingly, during the ordinary operation except start-up and shut-down, this control ensures that the temperature of the high pressure main steam is kept constant, despite a change in the state quantity of the exhaust gas (e.g. flow rate, pressure, temperature and composition). To put it another way, the flow rate and pressure of the high pressure main steam are subject to change.

A combined cycle power generation facility arranged in the aforementioned configuration normally requires maintenance work such as cleaning of the compressor 1 in order to recover the compressor efficiency. In this connection, the following describes the details of an embodiment of the maintenance planning system of the power generation facility in order to determine the timing for the aforementioned maintenance work.

Figure 3:
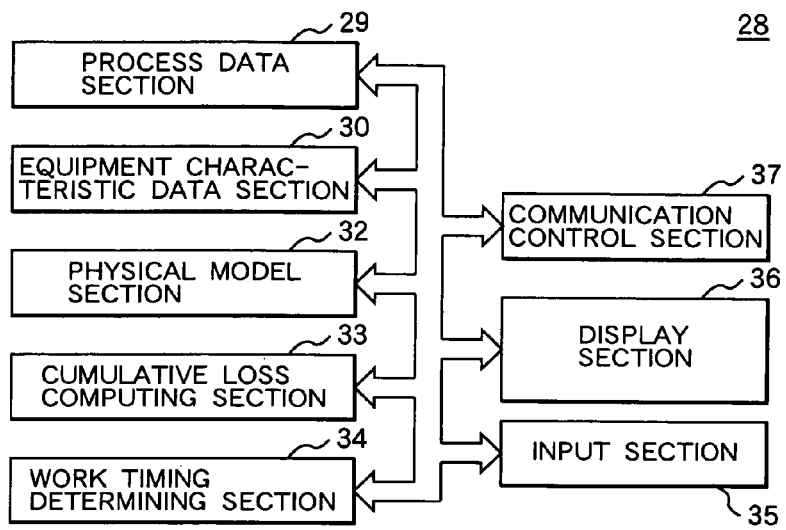
FIG. 3 is a block diagram representing the schematic arrangement of a maintenance planning support system as an embodiment of the present invention.
Figure 4:
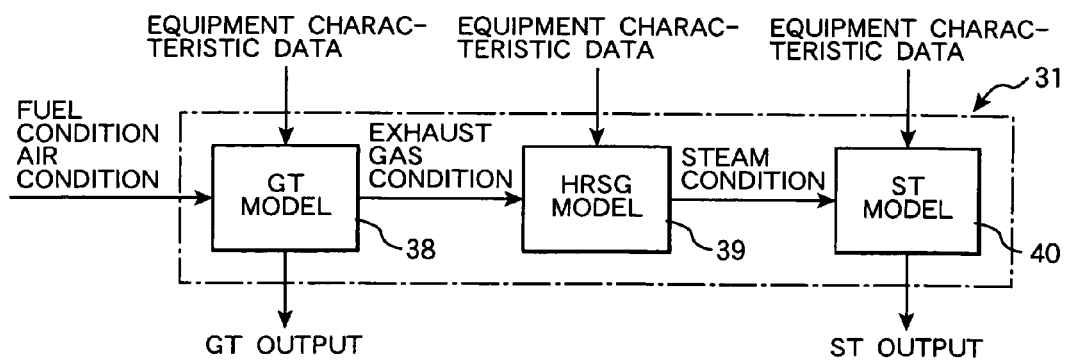
FIG. 4 is a block diagram representing the arrangement of the physical model of a combined cycle power generation facility in an embodiment of the maintenance planning support method for the power generation facility of the present invention.

FIG. 3 is a block diagram representing the schematic arrangement of a maintenance planning support system as an embodiment of the present invention. FIG. 4 is a block diagram representing the arrangement of the physical model of a combined cycle power generation facility.

In FIGS. 3 and 4, the maintenance planning support system 28 contains:

a process data section 29 for acquiring and storing the process data such as the sensor data of the aforementioned combined cycle power generation facility, setting input data, and control signal;

an equipment characteristic data section 30 for calculating the equipment characteristic data (e.g. compressor efficiency of the gas turbine 4) from the process data;

a physical model section 32 for creating and storing the physical model 31 of the combined cycle power generation facility from the process data;

a cumulative loss computing section 33 (e.g. CPU) for computing the influence upon the overall power output of the power generation facility and the amount of reduced operation cost resulting from the recovery of the equipment characteristic subsequent to maintenance work, using the physical model 31 of the combined cycle power generation facility; and a work timing determining section 34 (e.g. CPU) for determining the timing of maintenance work by comparison between the cumulative loss computed by the cumulative loss computing section 33 and the maintenance cost.

The maintenance planning support system 28 is provided with:

an input section 35 (e.g. keyboard) for permitting the operator to input the aforementioned maintenance cost and others;

a display section 36 (e.g. screen display apparatus) for displaying the trend data (FIG. 9(d) to be discussed later) such as the aforementioned amount of the reduced operation cost or cumulative loss; and a communication control section 37 for supplying the user with the information including the timing for executing the maintenance work determined by the work timing determining section 34, via communication means (not illustrated) such as the Internet and leased communication line.

The physical model 31 of the combined cycle power generation facility (C/C power generation facility model) is made up of a physical model 38 of a gas turbine (GT model), a physical model 39 of the heat recovery steam generator (HRSG model), and a physical model 40 of the steam turbine (ST model).

The physical model 38 of the gas turbine computes the gas turbine output (GT output) and the state quantity of exhaust gas, based on the equipment characteristics (compressor efficiency, fuel efficiency and turbine efficiency). The physical model 40 of the steam turbine computes the steam turbine output (ST output), based on the equipment characteristics and the state quantity of the generated steam computed by the physical model 39 of the heat recovery steam generator to be described later.

Figure 5:
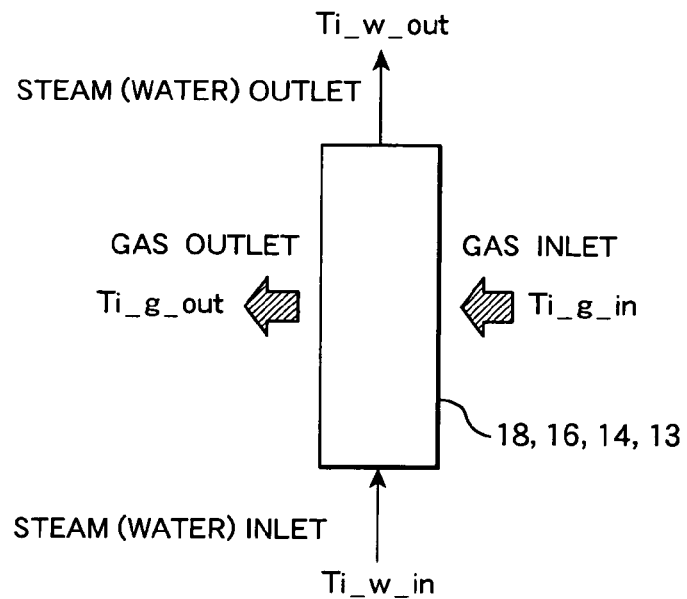
FIG. 5 is a schematic diagram representing the heat balance of the exhaust gas and steam or water in the heat exchanger constituting an embodiment of the generated steam estimation method for the heat recovery steam generator in the present invention.
Figure 6:
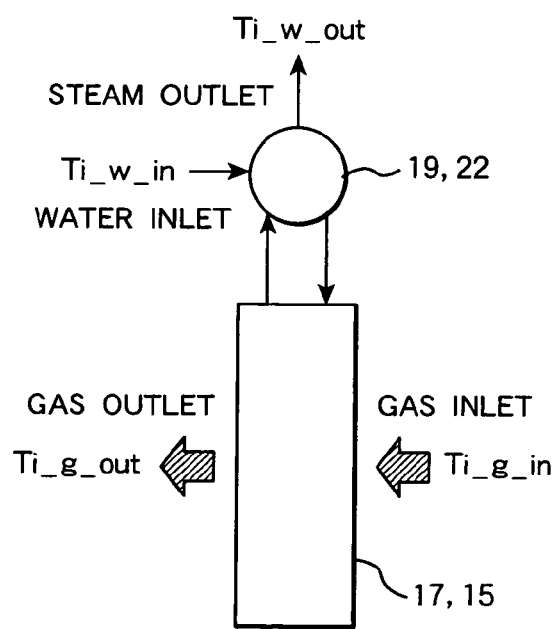
FIG. 6 is a schematic diagram representing the heat balance of the exhaust gas and steam or water in the heat exchanger constituting an embodiment of the generated steam estimation method for the heat recovery steam generator in the present invention.

The physical model 39 of the heat recovery steam generator as a major portion of the present embodiment computes the state quantity (flow rate, pressure and temperature) of the generated steam, based on the equipment characteristics (e.g. pressure loss, heat transfer area and heat transfer coefficient of each heat exchanger) and the state quantity (in addition, the water temperature at the inlet of the boiler) of the exhaust gas computed by the physical model 38 of the aforementioned gas turbine. The following describes the details of the aforementioned physical model 39 of the heat recovery steam generator]:

FIG. 5 is a schematic diagram representing the heat balance of the exhaust gas and steam (or water) in the low pressure economizer 18, high pressure economizer 16, high pressure primary superheater 14 and high pressure secondary superheater 13. FIG. 6 is a schematic diagram representing the heat balance of the exhaust gas and steam (or water) in the low pressure evaporator 17 and high pressure evaporator 15. Referring to FIGS. 5 and 6 and FIG. 2, the following describes the method of computing the heat balance of the exhaust gas and steam (or water) in each of the heat exchangers (e.g low pressure economizer 18, low pressure evaporator 17, high pressure economizer 16, high pressure evaporator 15, high pressure primary superheater 14, and high pressure secondary superheater 12.

(1) Heat Balance Relational Expression of Exhaust Gas and Steam (or Water)

The following expressions (1) and (2) are given by the heat balance of the exhaust gas and steam (or water) in each heat exchanger. These expressions (1) and (2) are based on the following assumption of low pressure economizer 18 (i=1), low pressure evaporator 17 (i=2), high pressure economizer 16 (i=3), high pressure evaporator 15 (i=4), high pressure primary superheater 14 (i=5) and high pressure secondary superheater 13 (i=6).

$$Qi\_a = Fg(Hi\_g\_in - Hi\_g\_out) = Fi\_w(Hi\_w\_out - Hi\_w\_in) \quad (1)$$

Qi_a: Amount of heat transfer in each heat exchanger

Fg: Flow rate of exhaust gas in each heat exchanger

Hi_g_in: Enthalpy on the exhaust gas inlet side in each heat exchanger

Hi_g_out: Enthalpy on the exhaust gas outlet side in each heat exchanger

Fi_w: Flow rate of steam (or water) in each heat exchanger

Hi_g_out: Enthalpy on the steam (or water) outlet side in each heat exchanger

Hi_w_in: Enthalpy on the steam (or water) inlet side in each heat exchanger

It should be noted that the enthalpy on the exhaust gas inlet side in each heat exchanger Hi_g_in is obtained according to the physical properties chart from the pressure and temperature on the exhaust gas inlet side. The enthalpy on the exhaust gas outlet side in each heat exchanger Hi_g_out is obtained according to the physical properties chart from the pressure and temperature on the exhaust gas outlet side. The enthalpy on the steam (or water) outlet side in each heat exchanger Hi_w_out is obtained according to the physical properties chart from the pressure and temperature on the steam (or water) outlet side The enthalpy on the steam (or water) inlet side in each heat exchanger Hi_w_in is obtained according to the physical properties chart from the pressure and temperature on the steam (or water) inlet side. To be more specific, despite the presence of enthalpy, the flow rate, temperature and pressure of the exhaust gas and steam (or water) are used as variables in the expression (1) The amount of heat transfer in each exchanger Qi_a can be said to have been calculated from the difference in inlet/outlet temperatures of the exhaust gas or the difference in inlet/outlet temperatures of the steam (or water).

$$Qi\_b = Ki \times Ai \times \Delta Ti \quad (2)$$

Qi_b: Amount of heat transfer in each heat exchanger

Ki: Heat transfer coefficient in each heat exchanger

Ai: Heat transfer area in each heat exchanger

ΔTi: Temperature difference of exhaust gas and steam (or water) in each heat exchanger It should be noted that the Ki (heat transfer coefficient in each heat exchanger) and Ai (heat transfer area in each heat exchanger) are given as predetermined set values. The temperature difference ΔTi of the exhaust gas and steam (or water) are given by the following expressions (3) through (5):

$$\Delta Ti = (Ti\_g - Ti\_w)/\ln(Ti\_g - Ti\_w) \quad (3)$$

Ti_g: Typical temperature of exhaust gas in each heat exchanger

Ti_w: Typical temperature of steam (or water) in each heat exchanger $$Ti\_g = (Ti\_g\_in + Ti\_g\_out)/2 \quad (4)$$

Ti_g_in: Temperature of exhaust gas at the inlet in each heat exchanger

Ti_g_out: Temperature of exhaust gas at the outlet in each heat exchanger $$Ti\_w = (Ti\_w\_in + Ti\_w\_out)/2 \quad (5)$$

Ti_w_in: Temperature of steam (or water) at the inlet in each heat exchanger

Ti_w_out: Temperature of steam (or water) at the outlet in each heat exchanger The temperatures of the exhaust gas and steam (or water) are used as variables in the expression (2) and the Qi_b (amount of heat transfer in each heat exchanger) can be said to have been obtained from the difference in temperatures of the exhaust gas and steam (or water).

(2) Flow Rate Conditions

In all the heat exchangers, the flow rate Fg of exhaust gas is constant (equivalent to flow rate at the steam generator inlet). To be more specific, it can be obtained from the total of the flow rate of fuels and amount of compressed air in the gas turbine 4.

In the meantime, flow rate of steam (or water) in each heat exchanger Fi_w is an unknown. It is necessary to calculate the optimum values for the flow rate Flp of low pressure main steam in the pipe 9, the flow rate Fhp of high pressure main steam in the pipe 10 and spray flow rate Fsp in the high pressure spray 26. If the optimum values of these flow rates Flp, Fhp and Fsp have been obtained, the water flow rate F1_w (Flp+Fhp) in the low pressure economizer 18 can be obtained, and steam flow rate F2_w=Flp in the low pressure evaporator 17 can also be obtained. From the spray flow rate Fsp of the high pressure spray 26 in the pipe 27, the steam (or water) flow rates F3_w, F4_w and F5_w in the high pressure economizer 16, high pressure evaporator 15 and high pressure primary superheater 14 are (Fhp−Fsp),respectively. This gives the flow rate F6_w of steam in the high pressure secondary superheater 13.

(3) Pressure Conditions

The pressures of the exhaust gas at the outlet and inlet in each heat exchanger are stored in the storage means such as an internal memory, and can be obtained from the pressure loss value of each heat exchanger preset in response to the exhaust gas flow rate Fg. To be more specific, the pressure of the exhaust gas at the outlet in the low pressure economizer 18 (i.e. the steam generator outlet pressure of the heat recovery steam generator 11) is the atmospheric pressure. Calculation is made based on the assumption that:

the value obtained by adding the pressure loss of the low pressure economizer 18 to the atmospheric pressure is the pressure of the exhaust gas at the inlet in the low pressure economizer 18;

the value obtained by adding the pressure loss of the low pressure evaporator 17 to the pressure of the exhaust gas at the inlet in the low pressure economizer 18 (i.e. the pressure of the exhaust gas at the outlet in the low pressure evaporator 17) is the pressure of the exhaust gas at the inlet in the low pressure evaporator 17;

the value obtained by adding the pressure loss of the high pressure economizer 16 to the pressure of the exhaust gas at the inlet in the low pressure evaporator 17 (i.e. the pressure of the exhaust gas at the outlet in the high pressure economizer 16) is the pressure of the exhaust gas at the inlet in the high pressure economizer 16;

the value obtained by adding the pressure loss of the high pressure evaporator 15 to the pressure of the exhaust gas at the inlet in the high pressure economizer 16 (i.e. the pressure of the exhaust gas at the outlet in the high pressure evaporator 15) is the pressure of the exhaust gas at the inlet in the high pressure evaporator 15;

the value obtained by adding the pressure loss of the high pressure primary superheater 14 to the pressure of the exhaust gas at the inlet in the high pressure evaporator 15 (i.e. the pressure of the exhaust gas at the outlet in the high pressure primary superheater 14) is the pressure of the exhaust gas at the inlet in the high pressure primary superheater 14; and the value obtained by adding the pressure loss of the high pressure primary superheater 14 to the pressure of the exhaust gas at the inlet in the high pressure evaporator 15 (i.e. the pressure of the exhaust gas at the outlet in the high pressure primary superheater 14) is the pressure of the exhaust gas at the inlet in the high pressure primary superheater 14.

In the meantime, the pressure of steam (or water) at the inlet and outlet in each heat exchanger are stored in the storage means such as an internal memory, and can be obtained from the flow rate/pressure transform function preset in advance corresponding to each heat exchanger.

(4) Temperature Conditions

As shown in FIG. 5, in the low pressure economizer 18, high pressure economizer 16, high pressure primary superheater 14 and high pressure secondary superheater 13, the temperature of exhaust gas at the outlet Ti_g_out and the temperature of steam (or water) at the inlet Ti_w_in etc. (in addition, the aforementioned flow rate and pressure conditions) are given, and the (temperature of exhaust gas at the inlet Ti_g_in and temperature of steam (or water) at the outlet Ti_w_out are calculated according to the simultaneous equations (1) and (2), as will be described later in details.

As shown in FIG. 6, in the low pressure evaporator 17 and high pressure evaporator 15, water has been phase-converted into steam and is in the state of saturation. Accordingly, if the pressure is known, the temperature of steam (saturation temperature) at the outlet Ti_w_out can be obtained from the physical properties table. Thus, the temperature of steam at the outlet Ti_w_out, the temperature of water at the inlet Ti_w_in and temperature of exhaust gas at the outlet Ti_g_out etc. (in addition, the aforementioned flow rate and pressure conditions) are given, and the temperature of exhaust gas at the inlet Ti_g_in can be obtained according to the aforementioned expression (1). The temperature of water at the inlet Ti_w_in and temperature of steam at the outlet Ti_w_in in the low pressure evaporator 17 (or high pressure evaporator 15) are regarded as the temperature of water at the inlet and temperature of steam at the outlet in the low pressure steam drum 19 (or high pressure steam drum 22).

Figure 7:
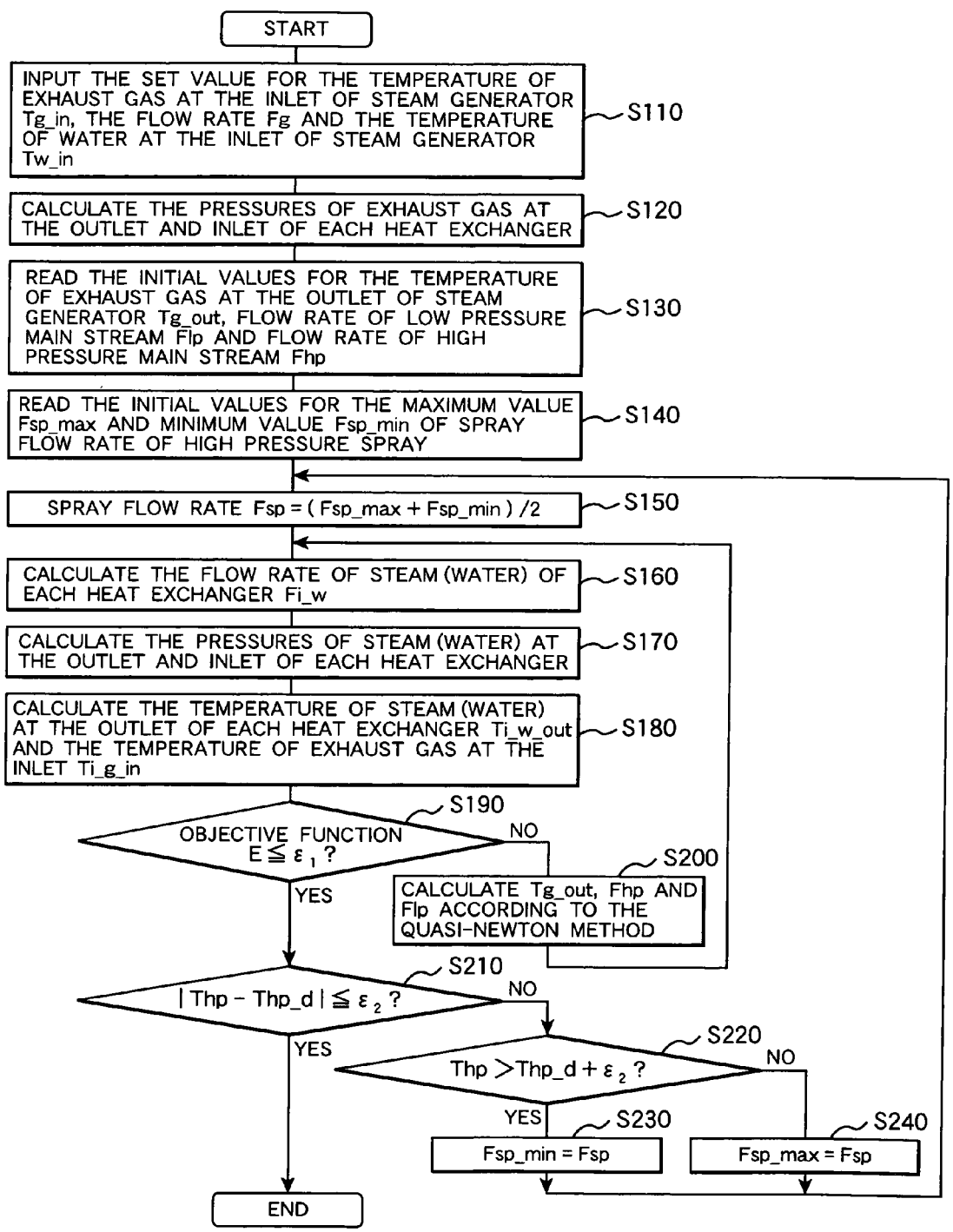
FIG. 7 is a flow chart representing the procedures of generated steam estimation method for the heat recovery steam generator in the present invention.

The following describes the method of estimating the state quantity of the generated low and high pressure main steam and the state quantity of the high pressure main steam (flow rate, pressure and temperature), from the state quantity of the exhaust gas introduced into the heat recovery steam generator 11 (temperature and flow rate at the inlet of the steam generator), according to the aforementioned relational expressions and conditions. FIG. 7 is a flow chart representing the procedures of the method of estimating the generated steam of the heat recovery steam generator.

Predetermined set values or measured values are inputted in Step 110 as the temperature of water from the condenser 5 at the outlet of the steam generator Tw_in, the temperature of exhaust gas from the gas turbine 4 at the outlet of the steam generator Tg_in and flow rate Fg. The system goes to Step 120, and the pressure loss of each heat exchanger in response to the flow rate of the exhaust gas Fg are read to perform computation to obtain the pressures of the exhaust gas at the inlet and outlet in each heat exchanger. The system then goes to Step 130 to read the temperature of the exhaust gas at the outlet of the steam generator Tg_out set and stored as an initial input value in the storage means such as an internal memory in advance, and generation flow rates Flp and Fhp of the high pressure main steam and low pressure main steam. Then the system then goes to Step 140 to read the maximum value Fsp_max and the minimum value Fsp_min for the spray flow rate of the high pressure spray 26 set and stored as an initial input value in the storage means such as an internal memory in advance. Proceeding to Step 150, the system calculates (Fsp_max+Fsp_min)/2 as the initial value for the spray flow rate Fsp of the high pressure spray 26. Further proceeding to Step 160, the system calculates the flow rates F1_w through F6_w of steam (or water) in each heat exchanger, based on the flow rates Flp and Fhp of the high pressure main steam and low pressure main steam, and the spray flow rate Fsp of the high pressure spray 26. Then in Step 170, the pressures of the steam (or water) at the inlet and outlet in each heat exchanger are calculated according to the flow rate/pressure transform function of each heat exchanger.

In Step 180, the expressions (1) and (2) are used to calculate the temperature of exhaust gas at the inlet in each heat exchanger Ti_g_in and the temperature of steam (or water) at the outlet in each heat exchanger Ti_w_out for the low pressure economizer 18, low pressure evaporator 17, high pressure economizer 16, high pressure evaporator 15, high pressure primary superheater 14 and high pressure secondary superheater 13 in that order. To put it in greater details; in the low pressure economizer 18, the temperature of the exhaust gas at the inlet Ti_g_in and the temperature of the water at the outlet Ti_w_out are calculated by the simultaneous equation of the aforementioned expressions (1) and (2), wherein:

the aforementioned flow rate Fg of the exhaust gas, flow rate of water Fi_w=Flp+Fhp, and the pressures of the exhaust gas and water at the inlet and outlet in response thereto are inputted;

the temperature at the outlet of the steam generator Tg_out as the aforementioned initial value is inputted into the temperature of the exhaust gas at the outlet Ti_g_out; and the temperature at the inlet of the steam generator Tw_in as the aforementioned set value is inputted into the temperature of the water at the inlet Ti_w_in.

In the low pressure evaporator 17, the temperature of the exhaust gas at the inlet T2_g_in is calculated by the equation (1), wherein:

the flow rate of the exhaust gas Fg, the flow rate of the steam (or water) F2_w=Flp, and the pressures of the exhaust gas and water at the inlet and outlet in response thereto are inputted;

the temperature of the exhaust gas at the inlet T1_g_in in the low pressure economizer 18 is inputted into the temperature of the exhaust gas at the outlet T2_g_out;

the temperature of water at the outlet T1_w_out in the low pressure economizer 18 is inputted into the temperature of water at the inlet T2_w_in; and the temperature of the steam at the outlet (saturation temperature) T2_w_out obtained separately in response to the pressure at the outlet are inputted.

The flow rate of steam F2_w in the low pressure evaporator 17 having been calculated, the pressure and temperature at the outlet, and temperature at the outlet T2_g_out represent the flow rate Flp, pressure and temperature Tlp of the generated low pressure main steam.

In the high pressure economizer 16, the temperature of the exhaust gas at the inlet T3_g_in and the temperature of the water at the outlet T3_w_out are calculated by the simultaneous equations of the aforementioned expressions (1) and (2), wherein:

the aforementioned flow rate Fg of the exhaust gas, flow rate of water F3_w=Fhp−Fsp, and the pressures of the exhaust gas and water at the inlet and outlet in response thereto are inputted;

the temperature of the exhaust gas at the inlet T2_g_in in the low pressure evaporator 17 is inputted into the temperature of the exhaust gas at the outlet T3_g_out; and the temperature of water at the outlet T1_w_out in the low pressure economizer 18 is inputted into the temperature of the water at the inlet T3_w_in.

In the high pressure evaporator 15, the temperature of the exhaust gas at the inlet T4_g_in is calculated by the aforementioned expression (1), wherein:

the aforementioned flow rate Fg of the exhaust gas, flow rate of water F4_w=Fhp−Fsp, and the pressures of the exhaust gas and steam (or water) at the inlet and outlet in response thereto are inputted; the temperature of the exhaust gas at the inlet T3_g_in in the high pressure economizer 16 is inputted into the temperature of the exhaust gas at the outlet T4_g_out;

the temperature of water at the outlet T3_w_out in the high pressure economizer 16 is inputted into the temperature of the water at the inlet T4_w_in; and the temperature of steam at the outlet (saturation temperature) T4_w_out obtained separately in response to the pressure at the outlet is inputted.

In the high pressure primary superheater 14, the temperature of the exhaust gas at the inlet T5_g_in and the temperature of the steam at the outlet T5_w_out are calculated by the simultaneous equation of the aforementioned expressions (1) and (2), wherein:

the aforementioned flow rate Fg of the exhaust gas, flow rate of water F5_w=Fhp−Fsp, and the pressures of the exhaust gas and water at the inlet and outlet in response thereto are inputted;

the temperature of the exhaust gas at the inlet T4_g_in in the high pressure evaporator 15 is inputted into the temperature of the exhaust gas at the outlet T5_g_out; and the temperature of water at the outlet T4_w_out in the high pressure evaporator 15 is inputted into the temperature of steam at the inlet T5_w_in.

In the high pressure spray 26, the state quantity (flow rate F5_w and temperature at the outlet T5_w_out) of the steam from the high pressure primary superheater 14, and the state quantity (spray flow rate Fsp and temperature of water at the outlet T1_w_out) of the water from the low pressure economizer 18 through the pipe 27 are used to calculate the heat balance, whereby the spray water temperature of the high pressure spray 26 is calculated.

In the high pressure secondary superheater 13, the temperature of the exhaust gas at the inlet T6_g_in and the temperature of water at the outlet T6_w_out are calculated by the simultaneous equations of the aforementioned expressions (1) and (2), wherein:

the aforementioned flow rate Fg of the exhaust gas, flow rate of water F6_w=Fhp, and the pressures of the and exhaust gas and water at the inlet and outlet in response thereto are inputted;

the temperature of the exhaust gas at the inlet T5_g_in in the high pressure primary superheater 14 is inputted into the temperature of the exhaust gas at the outlet T6_g_out; and the temperature of spray water of the high pressure spray 26 is inputted into the temperature of steam at the inlet T6_w_in.

The flow rate of stream F6_w in the high pressure secondary superheater 13 having been calculated, the pressure at the outlet, and temperature at the outlet T6_g_out represent the flow rate Fhp, pressure and temperature Thp of the generated high pressure main steam.

In the manner described above, the state quantity of the exhaust gas and steam (or water) in each heat exchanger is calculated successively. In some cases, however, there is a big difference between the calculated value for the temperature of exhaust gas at the inlet of the steam generator Tg_in and a predetermined set value Tg_in_d having been inputted in the aforementioned Step 110. In the calculation of heat balance in the low pressure evaporator 17 and high pressure evaporator 15, consideration is given only to the expression (1), not to the expression (2). For this reason, the system goes to Step 190 to calculate the objective function E as an index, stored in advance in the storage means such as an internal memory, intended for consistency. (See the following expression).

$$E(Tg\_out, Flp, Fhp) = (Tg\_in/Tg\_d - 1)^2 + (Q2\_a/Q2\_b - 1)^2 + (Q4\_a/Q4b - 1)^2 \quad (6)$$

This objective function E is the sum total of:

a square of the deviation between the calculated value of temperature of exhaust gas at the inlet Tg_in and a predetermined set value (or measured value) Tg_in_d; and a square of the deviation between the amount of heat transfer Q2_a calculated from the difference in temperatures of exhaust gas at the inlet and outlet in the low pressure evaporator 17 or the difference in temperatures water/steam at the inlet and outlet, and the amount of heat transfer Q2_b calculated from the difference in temperatures of exhaust gas and water. In order to allow this objective function E to come closer to zero (a predetermined target value) (i.e. to allow each deviation to come closer to zero), a decision step is taken to determine whether or not the objective function E does not exceed the predetermined threshold value (allowance) $\epsilon_1$.

If the objective function E is greater than the predetermined threshold value $\epsilon_1$, the requirement for the decision in Step 190 is not met and the system goes to Step 200. In Step 200, the temperature of exhaust gas at the outlet of the steam generator Tg_out and the flow rates of low pressure main steam and high pressure main steam Flp and Fhp are rewritten according to the quasi-Newton method (e.g. using the partial differential value of the objective function E in expressions (7), (8) and (9)), a known method in this connection.

$$\partial E/\partial Tg\_out = \{E(Tg\_out + \Delta Tg\_out/2, Flp, Fhp) - E(Tg\_out - \Delta Tg\_out/2, Flp, Fhp)\}/\Delta Tg\_in \quad (7)$$

$\Delta Tg\_out$: A variation of the temperature of exhaust gas at the outlet of the steam generator $$\partial E/\partial \Delta Fhp = \{E(Tg\_out, Flp + \Delta Flp/2, Fhp) - E(Tg\_out, Flp - \Delta Flp/2, Fhp)\}/\Delta Flp \quad (8)$$

$\Delta Flp$: A variation of the flow rate of low pressure main steam $$\partial E/\partial \Delta Fhp = \{E(Tg\_out, Flp, Fhp + \Delta Fhp/2) - E(Tg\_out, Flp, Fhp - \Delta Fhp/2)\}/\Delta Flp \quad (9)$$

$\Delta Fhp$: A variation of the flow rate of high pressure main steam

The aforementioned Steps 160 through 200 are repeated until the objective function E reaches the predetermined threshold value $\epsilon_1$ or less. When objective function E has reached the predetermined threshold value $\epsilon_1$ or less, the requirement of Step 190 is met, and the temperature of the exhaust gas at the outlet of the steam generator Tg_out and the flow rates of low pressure main steam and high pressure main steam Flp and Fhp are obtained as the temporary optimum values (since the optimum value for the spray flow rate of the high pressure spray 26 has not yet been worked out). Then the system goes to Step 210. In Step 210, comparison is made between the temperature Thp of the high pressure main steam (i.e. the temperature of steam at the outlet T6_w_out in the high pressure secondary superheater 13) and the predetermined control temperature Thp_d. A decision step is taken to determine whether or not the deviation thereof. |Thp−Thp_d| is the predetermined threshold value $\epsilon_2$ or less.

If the deviation |Thp−Thp_d| is greater than the threshold value $\epsilon_2$, the requirement in Step 210 is not met, and the system goes to Step 220. In Step 220, a decision step is taken to determine whether or not the temperature of high pressure main steam Thp is greater than the predetermined control temperature Thp_d (i.e. Thp>Thp_d+$\epsilon_2$). If the temperature of high pressure main steam Thp is greater than the predetermined control temperature Thp_d (i.e. Thp>Thp_d+$\epsilon_2$), the requirement in Step 210 is met, and the system goes to Step 230. In Step 230, the minimum value Fsp_min for the spray flow rate of the high pressure spray is rewritten in terms of the spray flow rate Fsp having been worked out previously. Then the system goes to Step 150, where spray flow rate Fsp= (Fsp_max+Fsp)/2 is worked out. To put it another way, Steps 230 and 150 allow the spray flow rate Fsp to be estimated at a value greater than the precious one. After that, the procedures of Steps 160 through 210 are repeated.

In Step 220, if the temperature of high pressure main steam Thp does not exceed the predetermined control temperature Thp_d (i.e. Thp≦Thp_d+$\epsilon_2$), the requirement in Step 210 is not met, and the system goes to Step 240. In Step 240, the maximum value Fsp_max for the spray flow rate of the high pressure spray 26 is rewritten in terms of the spray flow rate Fsp having been worked out previously. Then the system goes to Step 150, where spray flow rate Fsp=(Fsp+Fsp_min)/2 is worked out. To put it another way, Steps 240 and 150 allow the spray flow rate Fsp to be estimated at a value smaller than the precious one. After that, the procedures of Steps 160 through 210 are repeated.

If the deviation |Thp−Thp_d| does not exceed the threshold value $\epsilon_2$ in Step 210, the requirement in Step 210 is met, and the optimum value of the spray flow rate Fsp of the high pressure spray is obtained. Further, the temperature of the exhaust gas at the outlet Tg_out, and the flow rates of low pressure main steam and high pressure main steam Flp and Fhp are obtained as the optimum values. Thus, the flow rates of low pressure main steam and high pressure main steam Flp and Fhp, pressures and temperatures Tlp and Thp are obtained.

As described above, the generated steam estimation method for heat recovery steam generator of the present embodiment is capable of estimating the state quantity of generated steam from the state quantity of the exhaust gas to be introduced in a heat recovery steam generator 11. To be more specific, it is possible to provide the physical model of a heat recovery steam generator capable of calculating the state quantity of generated steam at the outlet of the steam generator from the state quantity of the exhaust gas at the inlet of the steam generator, in conformance with possible variations in the process data on the heat recovery steam generator 11. Thus, this method establishes the physical model 31 of a combined cycle power generation facility based on the combination between the physical model 38 of the gas turbine and the physical model 40 of the steam turbine through the physical model 39 of a heat recovery steam generator. Use of the physical model 31 of the combined cycle power generation facility makes it possible to predict and estimate the influence on the overall power output of the power generation facility, in the event of a rise in exhaust gas temperature resulting from the deterioration in the performance of the gas turbine 4. Thus, this method determines the timing for maintenance work such as washing operation of the gas turbine 4, for example.

Referring to FIGS. 8 and 9, the following describes the method of determining the timing for washing the gas turbine 4 using the maintenance planning support system 28. FIG. 8 is a diagram representing a method of calculation using the physical model 31 of the combined cycle power generation facility. FIG. 9(a) is a diagram showing chronological changes in the measured value of the overall power output of the combined cycle power generation facility. FIG. 9(b) is a diagram showing chronological changes in the measured value of the compressor efficiency of a gas turbine 4, together with a design value. FIG. 9(c) is a diagram showing chronological changes in the measured value of the fuel flow rate of a gas turbine 4, together with the expected value subsequent to washing operation. FIG. 9(d) is a diagram showing chronological changes in the cumulative loss of operation costs together with washing costs.

Generally, the gas turbine 4 uses a filter (not illustrated) to remove the dust and dirt from the air to be compressed. However, dust and dirt that cannot be removed by the filter come inside to stick onto the surface of the vane of the compressor 1. This will reduce the compressor efficiency and power output of the gas turbine 4, as shown in FIG. 9(b). While this reduces the power output of the gas turbine 4 in a required heating value (i.e. required fuel flow rate), this will be an increase in the temperature of the exhaust gas as well as the amount of steam generated by the heat recovery steam generator 11. This will lead to an increase in the output of the steam turbine 6 (wherein a decrease in the power output of the gas turbine is greater than an increase in the power output of the steam turbine). To ensure that the overall power output of the combined cycle power generation facility will reach the required level (measured value in FIG. 9(a)), the fuel flow rate is placed under variable control, as shown in FIG. 9(c), but there is an increase in the fuel cost as a factor of causing reduction in the compressor efficiency mentioned above (fuel flow rate with respect to the required power output). To solve this problem, a washing apparatus (e.g. water washing apparatus) for removing contamination of the compressor vane is installed to perform washing operation. However, this washing operation requires costs, and hence must be executed at properly timed intervals.

The cumulative loss computing section 33 of the maintenance planning support system 28 allows the design value of the compressor efficiency to be inputted into the physical model 31 of the combined cycle power generation facility, on the assumption that the compressor efficiency of the gas turbine 4 subsequent to washing operation gets back to the required design value (a value stored in the equipment characteristic data section 30 in advance or a value stored immediately after the previous washing operation). Then the cumulative loss computing section 33 calculates and estimates the expected value (reduced value) of the fuel flow rate subsequent to washing operation (FIG. 9(c)). To be more specific, the gas turbine output and the state quantity of the exhaust gas when the set value of the compressor efficiency is inputted is calculated by the physical model 38 of the gas turbine, as shown in FIGS. 8 and 4. Based on the calculated state quantity of the exhaust gas, the state quantity of the generated steam is calculated by the physical model 39 of the heat recovery steam generator. Based on the calculated state quantity of the generated steam, the power output of the steam turbine is calculated by the physical model 40 of the steam turbine.

The fuel flow rate is corrected based on the deviation between the theoretical value of the overall power output (a total of the gas turbine output and gas turbine output) of the power generation facility having been worked out, and the measured value. After that, the gas turbine output and the state quantity of the exhaust gas when the correction value of the fuel flow rate has been inputted are further calculated by the physical model 38. Based on the calculated state quantity of the exhaust gas, the state quantity of the generated steam is worked out by the physical model 39 of the heat recovery steam generator. Based on the state quantity of the generated steam, the steam turbine output is calculated by the physical model 40 of the steam turbine. The correction value of the fuel flow rate where there is an agreement between the theoretical value of the overall power output of the power generation facility having been worked out, and the measured value are obtained as the expected value subsequent to washing operation.

The cumulative loss computing section 33 computes the loss of fuel based on the difference between the expected value and measured value of the fuel flow rate. The result is multiplied by the fuel price to get the fuel loss. Then the cumulative loss in the operation cost from the previous washing time to the present time is computed by the cumulative loss computing section 33. The work timing determining section 34 makes comparison between the cumulative loss worked out by the cumulative loss computing section 33 and washing cost (e.g. washing operation cost and loss resulting from the power generation facility shutdown). If the cumulative loss is greater than the washing cost, a decision step is taken to determine that washing operation should be executed. In this case, the display section 36 displays the trend data as shown in FIGS. 9(a) through (d), and provides a quantitative display of improvement effects to be obtained when the washing operation is performed. The display section 36 also shows the message to prompt the implementation of the washing operation when the optimum timing for washing has come. The communication control section 37 sends the information on the timing for washing operation to the user through the communication means such as the Internet or a leased communication line.

As described above, in the present embodiment, the influence on the overall power output of the power generation facility when the equipment characteristics have been recovered (i.e. the influence on each of the gas turbine output and steam turbine output) can be calculated, using the physical model 31 of the combined cycle power generation facility based on the combination between the physical model 38 of the gas turbine and the physical model 40 of the steam turbine, through the physical model 39 of the heat recovery steam generator. Then the cumulative loss resulting from the absence of the maintenance work of the power generation facility is calculated, and the cumulative loss and maintenance cost are compared. This arrangement determines the timing for maintenance work at a reduced total cost.

What is claimed:

1. A generated steam estimation method for a heat recovery steam generator that estimates a flow rate, pressure and temperature of generated steam from a state quantity of exhaust gas to be introduced from a gas turbine, in which a computing apparatus for estimating the generated steam of the heat recovery steam generator is provided with a first computing procedure that performs the steps of:

inputting predetermined set values or measured values as flow rate of the exhaust gas;

computing pressure of the exhaust gas at an inlet and outlet of a plurality of heat exchangers in response to the flow rate of the exhaust gas;

reading an unknown flow rate of the generated steam as a desired initial value;

computing a flow rate of water or steam of a plurality of heat exchangers in response to the flow rate of the generated steam;

computing a pressure of water or steam at the inlet and outlet of a plurality of the heat exchangers in response to the flow rate of the water or steam of a plurality of the heat exchangers;

reading a predetermined set value as a temperature of the exhaust gas at an outlet of a boiler;

inputting predetermined set values or measured values as a water temperature at an inlet of the boiler;

wherein, as to at least one evaporator in a plurality of the heat exchangers, using a first expression for computing a heat transfer from a difference of Enthalpy between the inlet and outlet, which is computed by the flow rate, pressure and temperature of the exhaust gas; and using a second expression for computing a heat transfer from a difference of Enthalpy between the inlet and outlet, which is computed by the flow rate, pressure and temperature of the water or the steam; and as to the heat exchanger except the evaporator, using a third expression for computing a heat transfer from a heat transfer coefficient and a heat transfer area of the heat exchanger, temperature of the exhaust gas and the temperature of the water or the steam in addition to the first and second expressions, wherein a temperature of the exhaust gas at the inlet of the plurality of the heat exchangers, the temperature of the water or the steam at the outlet of the plurality of the heat exchangers is computed; and the computing apparatus further being provided with a second computing procedure that performs the steps of:

inputting predetermined set values or measured values as the temperature of the exhaust gas at the inlet of the boiler, computing an objective polynomial function having a deviation between a computed value of the exhaust gas at the inlet of the boiler and the predetermined set values or measured values being nominal variables thereof, and another deviation between the heat transfer of the evaporator calculated by using the first expression and second expression and the heat transfer calculated by using the third expression being another nominal variable thereof; and amending the temperature of the exhaust gas at the outlet of the boiler and the flow rate of the generated steam in the first computing procedure in order to allow a value of the objective function to become less than a predetermined threshold value and come closer to zero.

2. A generated steam estimation method for a heat recovery steam generator that estimates a flow rate, pressure and temperature of generated steam from a state quantity of exhaust gas to be introduced from a gas turbine in which a computing apparatus for estimating the generated steam of the heat recovery steam generator is provided with a first computing procedure that performs the steps of:

inputting predetermined set values or measured values as a flow rate of the exhaust gas;

computing exhaust gas pressure at an inlet and an outlet of a plurality of heat exchangers in response to the flow rate of the exhaust gas;

reading an unknown flow rate of the generated steam and spray flow rate of a high pressure spray as desired initial values;

computing a flow rate of water or steam of a plurality of the heat exchangers in response to the flow rate of the generated steam and the spray flow rate of the high pressure spray;

computing a pressure of water or steam at the inlet and outlet of a plurality of the heat exchangers in response to the flow rate of the water or steam of a plurality of the heat exchangers;

reading a predetermined set value as a temperature of the exhaust gas at an outlet of a boiler; and inputting predetermined set values or measured values as a water temperature at an inlet of the boiler;

wherein in the first computing procedure, as to at least one evaporator in a plurality of the heat exchangers, using a first expression for computing a heat transfer from a difference of Enthalpy between an inlet and outlet, which is computed by the flow rate, pressure and temperature of the exhaust gas; and using a second expression for computing a heat transfer from a difference of Enthalpy between the inlet and outlet, which is computed by the flow rate, pressure and temperature of the water or the steam; and as to the heat exchanger except the evaporator, using a third expression for computing a heat transfer from a heat transfer coefficient and a heat transfer area of the heat exchanger, temperature of the exhaust gas and the temperature of the water or the steam in addition to the first and second expressions, wherein the temperature of the exhaust gas at the inlet of the plurality of the heat exchangers, the temperature of the water or the steam at the outlet of the plurality of the heat exchangers is computed; and the computing apparatus being further provided with a second computing procedure that performs the steps of:

inputting predetermined set values or measured values as the temperature of the exhaust gas at the inlet of the boiler, computing an objective polynomial function having a deviation between a computed value of the exhaust gas at the inlet of the boiler and the predetermined set values or measured values as nominal variables thereof, and another deviation between the heat transfer of the evaporator calculated by using the first expression and second expression and the heat transfer calculated by using the third expression as another nominal variable thereof; and amending the temperature of the exhaust gas at the outlet of the boiler and the flow rate of the generated steam in the first computing procedure in order to allow a value of the objective function to become less than a predetermined threshold value and come close to zero, and further amending the spray flow rate of the high pressure spray in the first computing procedure in order to allow a deviation between a computed value of the temperature of the generated steam and a predetermined set value controlled by the high pressure spray to become less than a predetermined threshold value and become closer to zero.

3. A generated steam estimation device for a heat recovery steam generator capable of estimating a flow rate, pressure and temperature of generated steam from a state quantity of exhaust gas to be introduced from a gas turbine in which a computing apparatus for estimating the generated steam of the heat recovery steam generator is provided with an inputting section, performing the steps of:

inputting predetermined set values or measured values as a flow rate of the exhaust gas;

reading an unknown flow rate of the generated steam as a desired initial value;

reading an unknown temperature of the exhaust gas at an outlet of a boiler as a desired initial value;

inputting predetermined set values or measured values of a temperature of the water at the an inlet of the boiler; and inputting predetermined set values or measured values of a temperature of the exhaust gas at the inlet of the boiler;

the computing apparatus being further provided with a first computing section, performing the steps of:

computing pressure of the exhaust gas at an inlet and outlet of a plurality of heat exchangers in response to the flow rate of the exhaust gas;

computing flow rate of water or steam of a plurality of heat exchangers in response to the flow rate of the generated steam;

computing pressure of water or steam at the inlet and outlet of a plurality of the heat exchangers in response to the flow rate of the water or steam of a plurality of the heat exchangers;

using a first expression for computing a heat transfer from a difference of Enthalpy between the inlet and outlet, which is computed by the flow rate, pressure and temperature of the exhaust gas; and using a second expression for computing a heat transfer from a difference of Enthalpy between the inlet and outlet, which is computed by the flow rate, pressure and temperature of the water or the steam; and as to the heat exchanger except an evaporator, using a third expression for computing a heat transfer from a heat transfer coefficient and a heat transfer area of the heat exchanger, temperature of the exhaust gas and the temperature of the water or the steam in addition to the first and second expressions, wherein the temperature of the exhaust gas at the inlet of plurality of the heat exchangers and the temperature of the water or the steam at the outlet of plurality of the heat exchangers are computed; and the computing apparatus being further provided with a second computing section, performing the steps of:

computing an objective polynomial function having a deviation between a computed value of the exhaust gas at the inlet of the boiler and the predetermined set values or measured values as nominal variables thereof, and another deviation between the heat transfer of the evaporator calculated by using the first expression and second expression and the heat transfer calculated by using the third expression as another nominal variable thereof; and amending the temperature of the exhaust gas at the outlet of the boiler and the flow rate of the generated steam in the first computing procedure in order to allow a value of the objective function to become less than a predetermined threshold value and come closer to zero.

4. A generated steam estimation device for a heat recovery steam generator capable of estimating a flow rate, pressure and temperature of generated steam from a state quantity of exhaust gas to be introduced from a gas turbine; and a computing apparatus for estimating the generated steam of the heat recovery steam generator and being provided with an inputting section, performing the steps of:

inputting predetermined set values or measured values as a flow rate of the exhaust gas;

reading an unknown flow rate of the generated steam and spray flow rate of a high pressure spray as desired initial values;

reading an unknown temperature of the exhaust gas at an outlet of a boiler as desired initial value;

inputting predetermined set values or measured values of a temperature of water at an inlet of the boiler; and inputting predetermined set values or measured values of the temperature of the exhaust gas at the inlet of the boiler;

the computing apparatus further being provided with a first computing section, performing the steps of:

computing pressure of the exhaust gas at an inlet and outlet of a plurality of heat exchangers in response to the flow rate of the exhaust gas;

computing flow rate of water or steam of a plurality of heat exchangers in response to the flow rate of the generated steam and the spray flow rate of the high pressure spray;

computing pressure of water or steam at the inlet and outlet of a plurality of the heat exchangers in response to the flow rate of the water or steam of a plurality of the heat exchangers;

using a first expression for computing a heat transfer from a difference of Enthalpy between the inlet and outlet, which is computed by the flow rate, pressure and temperature of the exhaust gas; and using a second expression for computing a heat transfer from a difference of Enthalpy between the inlet and outlet, which is computed by the flow rate, pressure and temperature of the water or the steam; and as to the heat exchanger except an evaporator, using a third expression for computing a heat transfer from a heat transfer coefficient and a heat transfer area of the heat exchanger, temperature of the exhaust gas and the temperature of the water or the steam in addition to the first and second expressions, wherein the temperature of the exhaust gas at the inlet of plurality of the heat exchangers and the temperature of the water or the steam at the outlet of plurality of the heat exchangers are computed; and the computing apparatus being further provided with a second computing section, performing the steps of:

computing an objective polynomial function having a deviation between a computed value of the exhaust gas at the inlet of the boiler and the predetermined set values or measured values as nominal variables thereof, and another deviation between the heat transfer of the evaporator calculated by using the first expression and second expression and the heat transfer calculated by using the third expression as a nominal variable thereof;

amending the temperature of the exhaust gas at the outlet of the boiler and the flow rate of the generated steam in the first computing procedure in order to allow a value of the objective function to become less than a predetermined threshold value and come closer to zero; and amending the spray flow rate of the high pressure spray in the first computing section in order to allow a deviation between a computed value of the temperature of the generated steam and a predetermined set value controlled by the high pressure spray to become less than a predetermined threshold value and come closer to zero.

5. A maintenance planning support method for a power generation facility including:
   a computing apparatus for estimating generated steam of a heat recovery steam generator that is provided with a physical model of a combined cycle power generation facility,
   wherein the physical model of the combined cycle power generation facility is based on a combination of physical models of a gas turbine and steam turbine through a physical model of a heat recovery steam generator, comprising the steps of:
   computing an amount of an operation cost reduced by a recovery of equipment characteristics resulting from execution of maintenance work of the power generation facility, computing a cumulative loss of the operation cost resulting from an absence of said maintenance work; and determining a timing for implementing the maintenance work,
   the computing apparatus being provided with the physical model of the power generation facility and the physical model being provided with a first computing procedure, performing the steps of:
   inputting predetermined set values or measured values as a flow rate of exhaust gas;
   computing pressure of the exhaust gas at an inlet and outlet of a plurality of heat exchangers in response to the flow rate of the exhaust gas;
   reading an unknown flow rate of the generated steam as a desired initial value;
   computing flow rate of water or steam of a plurality of heat exchangers in response to the flow rate of the generated steam;
   computing pressure of water or steam at the inlet and outlet of a plurality of the heat exchangers in response to the flow rate of the water or steam of a plurality of the heat exchangers;
   inputting predetermined set value as temperature of the exhaust gas at an outlet of a boiler; and
   inputting predetermined set values or measured values as a water temperature at an inlet of the boiler;
   wherein, as to at least one evaporator in a plurality of the heat exchangers,
   using a first expression for computing a heat transfer from a difference of Enthalpy between the inlet and outlet, which is computed by the flow rate, pressure and temperature of the exhaust gas; and using a second expression for computing a heat transfer from a difference of Enthalpy between the inlet and outlet, which is computed by the flow rate, pressure and temperature of the water or the steam; and
   as to the heat exchanger except the evaporator, using a third expression for computing a heat transfer from a heat transfer coefficient and a heat transfer area of the heat exchanger, temperature of the exhaust gas and the temperature of the water or the steam in addition to the first and second expressions, wherein the temperature of the exhaust gas at the inlet of plurality of the heat exchangers and the temperature of the water or the steam at the outlet of plurality of the heat exchangers are computed; and
   the physical model is provided with a second computing procedure performing the steps of:
   inputting predetermined set values or measured values as the temperature of the exhaust gas at the inlet of the boiler,
   computing an objective polynomial function having a deviation between a computed value of the exhaust gas at the inlet of the boiler and the predetermined set values or measured values as nominal variables thereof, and another deviation between the heat transfer of the evaporator calculated by using the first expression and second expression and the heat transfer calculated by using the third expression as a nominal variable thereof; and
   amending the temperature of the exhaust gas at the outlet of the boiler and the flow rate of the generated steam in the first computing procedure in order to allow a value of the objective function to become less than a predetermined threshold value and closer to zero.

6. The maintenance planning support method for a power generation facility described in claim 5, including displaying on a display means indicates the amount of the operation cost reduced by the recovery of the equipment characteristics resulting from the execution of maintenance work or the cumulative loss of the operation cost resulting from the absence of said maintenance work.

7. The maintenance planning support method for power generation facility described in claim 5, including supplying the timing for executing said maintenance work is supplied to users via communication means.

8. A maintenance planning support system for a power generation facility comprising:
   a computing apparatus for estimating generated steam of a heat recovery steam generator having a physical model of a combined cycle power generation facility,
   wherein the physical model of the combined cycle power generation facility is based on a combination of physical models of a gas turbine and steam turbine through a physical model of a heat recovery steam generator,
   computing an amount of an operation cost reduced by a recovery of equipment characteristics resulting from the execution of maintenance work of the power generation facility,
   computing a cumulative loss of the operation cost resulting from an absence of said maintenance work; and determining a timing for implementing the maintenance work,
   the computing apparatus is provided with the physical model of the power generation facility and the physical model is provided with a first computing procedure, wherein;
   inputting predetermined set values or measured values as a flow rate of exhaust gas;
   computing pressure of the exhaust gas at an inlet and outlet of a plurality of heat exchangers in response to the flow rate of the exhaust gas;
   reading an unknown flow rate of the generated steam as a desired initial value;
   computing flow rate of water or steam of a plurality of heat exchangers in response to the flow rate of the generated steam;
   computing pressure of water or steam at the inlet and outlet of a plurality of the heat exchangers in response to the flow rate of the water or steam of a plurality of the heat exchangers;
   inputting predetermined set value as temperature of the exhaust gas at an outlet of a boiler;
   inputting predetermined set values or measured values as a water temperature at an inlet of the boiler;

wherein, as to at least one evaporator in a plurality of the heat exchangers, using a first expression for computing a heat transfer from a difference of Enthalpy between the inlet and outlet, which is computed by the flow rate, pressure and temperature of the exhaust gas; and using a second expression for computing a heat transfer from a difference of Enthalpy between the inlet and outlet, which is computed by the flow rate, pressure and temperature of the water or the steam; and as to the heat exchanger except the evaporator, using a third expression for computing a heat transfer from a heat transfer coefficient and a heat transfer area of the heat exchanger, temperature of the exhaust gas and the temperature of the water or the steam in addition to the first and second expressions, wherein the temperature of the exhaust gas at the inlet of plurality of the heat exchangers, the temperature of the water or the steam at the outlet of plurality of the heat exchangers are computed; and the physical model being provided with a second computing procedure, wherein;

inputting predetermined set values or measured values as the temperature of the exhaust gas at the inlet of the boiler, computing an objective polynomial function having a deviation between a computed value of the exhaust gas at the inlet of the boiler and the predetermined set values or measured values as nominal variables thereof, and another deviation between the heat transfer of the evaporator calculated by using the first expression and second expression and the heat transfer calculated by using the third expression as another nominal variable thereof; and amending the temperature of the exhaust gas at the outlet of the boiler and the flow rate of the generated steam in the first computing procedure in order to allow a value of the objective function to become less than a predetermined threshold value and come closer to zero.

9. The maintenance planning support system for power generation facility described in claim 8, further comprising display means for indicating the amount of the operation cost reduced by the recovery of the equipment characteristics resulting from the execution of maintenance work or the cumulative loss of the operation cost resulting from the absence of said maintenance work.

10. The maintenance planning support system for power generation facility described in claim 8, further comprising communication means for supplying users with the timing for executing said maintenance work determined by said computing apparatus.

11. A maintenance planning support method for power generation facility comprising:

a computing apparatus for estimating generated steam of a heat recovery steam generator, wherein a physical model of a combined cycle power generation facility is used based on a combination of physical models of a gas turbine and steam turbine through a physical model of a heat recovery steam generator, computing an amount of an operation cost reduced by a recovery of equipment characteristics resulting from the execution of maintenance work of the power generation facility, computing a cumulative loss of an operation cost resulting from absence of said maintenance work; and determining a timing for implementing the maintenance work, the computing apparatus being provided with the physical model of the power generation facility and the physical model being provided with a first computing procedure, performing the steps of:

inputting predetermined set values or measured values as a flow rate of exhaust gas;

computing pressure of the exhaust gas at an inlet and outlet of a plurality of heat exchangers in response to the flow rate of the exhaust gas;

reading an unknown flow rate of the generated steam and spray flow rate of a high pressure spray as desired initial values;

computing flow rate of water or steam of a plurality of heat exchangers in response to the flow rate of the generated steam and the spray flow rate of the high pressure spray;

computing pressure of water or steam at the inlet and outlet of a plurality of the heat exchangers in response to the flow rate of the water or steam of a plurality of the heat exchangers;

inputting predetermined set value as temperature of the exhaust gas at an outlet of a boiler;

inputting predetermined set values or measured values as a water temperature at an inlet of the boiler;

wherein, as to at least one evaporator in a plurality of the heat exchangers, using a first expression for computing a heat transfer from a difference of Enthalpy between the inlet and outlet, which is computed by the flow rate, pressure and temperature of the exhaust gas; and using a second expression for computing a heat transfer from a difference of Enthalpy between the inlet and outlet, which is computed by the flow rate, pressure and temperature of the water or the steam; and as to the heat exchanger except the evaporator, using a third expression for computing a heat transfer from a heat transfer coefficient and a heat transfer area of the heat exchanger, temperature of the exhaust gas and the temperature of the water or the steam in addition to the first and second expressions, wherein the temperature of the exhaust gas at the inlet of plurality of the heat exchangers, the temperature of the water or the steam at the outlet of plurality of the heat exchangers are computed; and the physical model being further provided with a second computing procedure performing the steps of:

inputting predetermined set values or measured values as the temperature of the exhaust gas at the inlet of the boiler, computing an objective polynomial function having a deviation between a computing value of the exhaust gas at the inlet of the boiler and the predetermined set values or measured values as nominal variables thereof, and another deviation between the heat transfer of the evaporator calculated by using the first expression and second expression and the heat transfer calculated by using the third expression being another nominal variable thereof;

amending the temperature of the exhaust gas at the outlet of the boiler and the flow rate of the generated steam in the first computing procedure in order to allow a value of the objective function to become less than a predetermined threshold value and come closer to zero; and the physical model being further provided with a third computing procedure performing the steps of:

amending the spray flow rate of the high pressure spray in the first computing procedure in order to allow a deviation between a computed value of the temperature of the generated steam and a predetermined set value controlled by the high pressure spray to become less than a predetermined threshold value and come closer to zero.

12. A maintenance planning support system for power generation facility comprising:

a computing apparatus for estimating generated steam of a heat recovery steam generator, wherein a physical model of a combined cycle power generation facility is used that is based on a combination of physical models of a gas turbine and steam turbine through a physical model of a heat recovery steam generator, a computing section in the computing apparatus for computing an amount of an operation cost reduced by a recovery of equipment characteristics resulting from execution of maintenance work of the power generation facility and computing a cumulative loss of the operation cost resulting from an absence of said maintenance work; and a computing section in the computing apparatus for determining a timing for implementing the maintenance work, the computing apparatus being provided with a physical model of the power generation facility and the physical model being provided with a first computing procedure performing the steps of:

inputting predetermined set values or measured values as a flow rate of exhaust gas;

computing pressure of the exhaust gas at an inlet and outlet of a plurality of heat exchangers in response to the flow rate of the exhaust gas;

reading an unknown flow rate of the generated steam and spray flow rate of a high pressure spray as desired initial values;

computing a flow rate of water or steam of a plurality of heat exchangers in response to the flow rate of the generated steam and the spray flow rate of the high pressure spray;

computing pressure of water or steam at the inlet and outlet of a plurality of the heat exchangers in response to the flow rate of the water or steam of a plurality of the heat exchangers;

inputting predetermined set value as temperature of the exhaust gas at an outlet of a boiler;

inputting predetermined set values or measured values as a water temperature at an inlet of the boiler;

wherein, as to at least one evaporator in a plurality of the heat exchangers, using a first expression for computing a heat transfer from a difference of Enthalpy between the inlet and outlet, which is computed by the flow rate, pressure and temperature of the exhaust gas; and using a second expression for computing a heat transfer from a difference of Enthalpy between the inlet and outlet, which is computed by the flow rate, pressure and temperature of the water or the steam; and as to the heat exchanger except the evaporator, using a third expression for computing a heat transfer from a heat transfer coefficient and a heat transfer area of the heat exchanger, temperature of the exhaust gas and the temperature of the water or the steam in addition to the first and second expressions, wherein the temperature of the exhaust gas at the inlet of plurality of the heat exchangers, the temperature of the water or the steam at the outlet of plurality of the heat exchangers are computed; and the physical model being provided with a second computing procedure performing the steps of:

inputting predetermined set values or measured values as the temperature of the exhaust gas at the inlet of the boiler, computing an objective polynomial function having a deviation between a computed value of the exhaust gas at the inlet of the boiler and the predetermined set values or measured values as nominal variables thereof, and another deviation between the heat transfer of the evaporator calculated by using the first expression and second expression and the heat transfer calculated by using the third expression as another nominal thereof;

amending the temperature of the exhaust gas at the outlet of the boiler and the flow rate of the generated steam in the first computing procedure in order to allow a value of the objective function to be less than a predetermined threshold value and come closer to zero; and the physical model being further provided with a third computing procedure performing the steps of:

amending the spray flow rate of the high pressure spray in the first computing procedure in order to allow a deviation between a computed value of the temperature of the generated steam and a predetermined set value controlled by the high pressure spray to become less than a predetermined threshold value and come closer to zero.

* * * * *